United States Patent [19]

Strulik et al.

[11] Patent Number: 4,467,824
[45] Date of Patent: Aug. 28, 1984

[54] SELF-CLOSING FIRE DAMPER FOR DUCT

[76] Inventors: Wilhelm P. Strulik, 2, rue d'Heurtebise, Roussemeau, Villeneuve-sur-Yonne, France; Jürgen Eidmann, Feldbergstr. 9, 6384 Schmitten, Fed. Rep. of Germany

[21] Appl. No.: 387,015

[22] Filed: Jun. 10, 1982

[30] Foreign Application Priority Data

Jun. 13, 1981 [DE] Fed. Rep. of Germany ....... 3123555

[51] Int. Cl.$^3$ ............................................. F16K 13/04
[52] U.S. Cl. ........................................ 137/74; 137/75; 137/512.1; 137/512.5
[58] Field of Search ...................... 137/72, 74, 75, 77, 137/512.1, 512.5

[56] References Cited

U.S. PATENT DOCUMENTS

| 2,956,582 | 10/1960 | Pranter | 137/512.1 |
| 3,009,475 | 11/1961 | Richterkessing | 137/512.1 |
| 3,076,469 | 2/1963 | Averill | 137/74 |
| 3,785,272 | 1/1974 | McNabney | 137/74 X |
| 4,146,048 | 3/1979 | McCabe | 137/75 |

FOREIGN PATENT DOCUMENTS

| 2316513 | 1/1975 | France | 137/75 |
| 1076671 | 7/1967 | United Kingdom | 137/512.1 |

Primary Examiner—Harold W. Weakley
Attorney, Agent, or Firm—Karl F. Ross; Herbert Dubno

[57] ABSTRACT

A fire-damper has a support adapted to be secured in the duct and having a pair of pivots defining respective parallel and spaced-apart pivot axes traversing the duct. Respective damper flaps are pivotal on the pivots about the respective axes between an open position extending generally parallel to and spaced from each other in line with the duct and a closed position generally coplanar transverse to the duct. Thus the flaps define in the open position open flow spaces between and to both sides of the flaps and in the closed position the flaps substantially block flow through the duct. A spring urges the damper flaps continuously into the closed position. A fusible link is connected between the flaps offset from the axes for retaining the flaps in the open position unless the link is heated beyond a predetermined temperature. This link extends across the flow space formed between the two flaps. Thus when the flaps are in the open position they are perfectly edge-on to flow and present the smallest possible impediment to flow.

3 Claims, 5 Drawing Figures

SELF-CLOSING FIRE DAMPER FOR DUCT

FIELD OF THE INVENTION

The present invention relates to a self-closing fire-damper assembly. More particularly this invention concerns such an assembly which is used in a heating or air-conditioning duct.

BACKGROUND OF THE INVENTION

A standard self-closing damper assembly for a duct has a support adapted to be secured in the duct and having a pivot defining a pivot axis traversing the duct, a pair of damper flaps pivotal on this pivot about the axis between an open position extending in line with the duct and a closed position generally coplanar transverse to the duct. Thus the flaps define in the open position open flow spaces to both sides of themselves and in the closed position the flaps substantially block flow through the duct. One or more springs urge the damper flaps continuously into the closed position. A fusible link is connected between the flaps offset from the axes to retain the flaps in the open position unless the link is heated beyond a predetermined temperature.

Thus when the link melts the springs snap the flaps into the closed position, thereby effectively blocking off flow in the duct. The entire assembly can be made at low cost of sheet metal and is required in fire-resistant construction between the so-called fire cells. When closed, such a damper assembly is effective to block flow in one direction like a standard flap-type check valve, and in the opposite direction its spring is normally designed to exert a very great force to hold it closed.

This type of construction has some drawbacks. It constitutes a flow restriction in the open position in which the two flaps are back to back in the center of the arrangement with the spring, pivot rod, and link between them. Such flow restriction must be designed for in carefully calculated work, perceptibly increasing overall system costs for ductwork of larger flow section, more powerful blowers, and so on. Furthermore, although effective to block flow in both directions for the reasons given above, such a damper assembly must be mounted relative to the normal direction of flow through the duct with the link lying upstream of the pivot axis, so that the link is not shielded by these parts from the heat in the duct. If mounted backward, the response time is increased considerably. This decreased sensitivity to flow in one direction is also disadvantageous, as during a fire flow can easily reverse in a heating or air-conditioning duct, so that the nominal rating (closing temperature of about 160° F.) is confused by different response times for flow in opposite directions. The slower rating is always employed, so that occasionally such damper assemblies close prematurely.

OBJECTS OF THE INVENTION

It is therefore an object of the present invention to provide an improved automatic fire-damper assembly.

Another object is the provision of such an automatic fire-damper assembly which overcomes the above-given disadvantages.

An object is thus to provide a damper assembly which offers very reduced resistance to flow in the duct it is installed in and which closes at a given temperature after a predetermined volume of flow over it in either direction, that is whose closing response is not direction sensitive.

SUMMARY OF THE INVENTION

These objects are attained according to the instant invention in a fire-damper having a support adapted to be secured in the duct and having a pair of pivots defining respective parallel and spaced-apart pivot axes traversing the duct. Respective damper flaps are pivotal on the pivots about the respective axes between an open position extending generally parallel to and spaced from each other in line with the duct and a closed position generally coplanar transverse to the duct. Thus the flaps define in the open position open flow spaces between and to both sides of the flaps and in the closed position the flaps substantially block flow through the duct. Biasing means urges the damper flaps continuously into the closed position. Means including a fusible link is connected between the flaps offset from the axes for retaining the flaps in the open position unless the link is heated beyond a predetermined temperature. This link extends across the flow space formed between the two flaps.

Thus with the system of this invention when the flaps are in the open position they are perfectly edge-on to flow and present the smallest possible impediment to flow. The normally created thick blockage formed by the two back-to-back flaps pivotal about the same axis is wholly avoided. In addition the link is in the flow of gas through the system in both directions, so that the device according to this invention is flow-direction insensitive.

According to another feature of this invention the flaps are substantially semicircular. In addition they are each formed with a pair of pivot tabs each formed at the respective pivot axis with a throughgoing pivot hole. The assembly includes pivot pins fixed in the support and extending into these pivot holes. One short rivet-like pivot pin is provided at each tab for each axis, so that four such pins are employed. Thus the blockage created by the prior-art throughgoing pivot pin is eliminated as each tab with its pivot pin can lie outside the flow cross-section formed by the inner lip the support normally has.

The biasing means is at least one spring braced between the support and the flaps. This can be respective hairpin springs each having one leg anchored on the support and another leg anchored on the respective tab offset from the respective pivot axis, with the two legs being stressed toward each other in the open position of the damper assembly and being relatively spaced apart and less stressed in the closed position of the damper assembly. The tabs are formed offset from the pivot holes with spring holes receiving the other legs of the respective springs. The support itself has a pair of diametrically opposite and axially extending carrying tabs carrying the pivot pins and the spring is a W-shaped double-hairpin spring. Such an arrangement has the enormous advantage that the spring exerts relatively modest force against the flaps in the open position, but in the closed position the angular force the spring exerts is much more, resisting opening with great force.

The biasing means can also be respective torsion springs braced between the support and the respective flaps, or a single tension spring braced between the flaps.

DESCRIPTION OF THE DRAWING

The above and other features and advantages will become more readily apparent from the following, reference being made to the accompanying drawing in which.

SPECIFIC DESCRIPTION

Figures 1, 2, 2A:
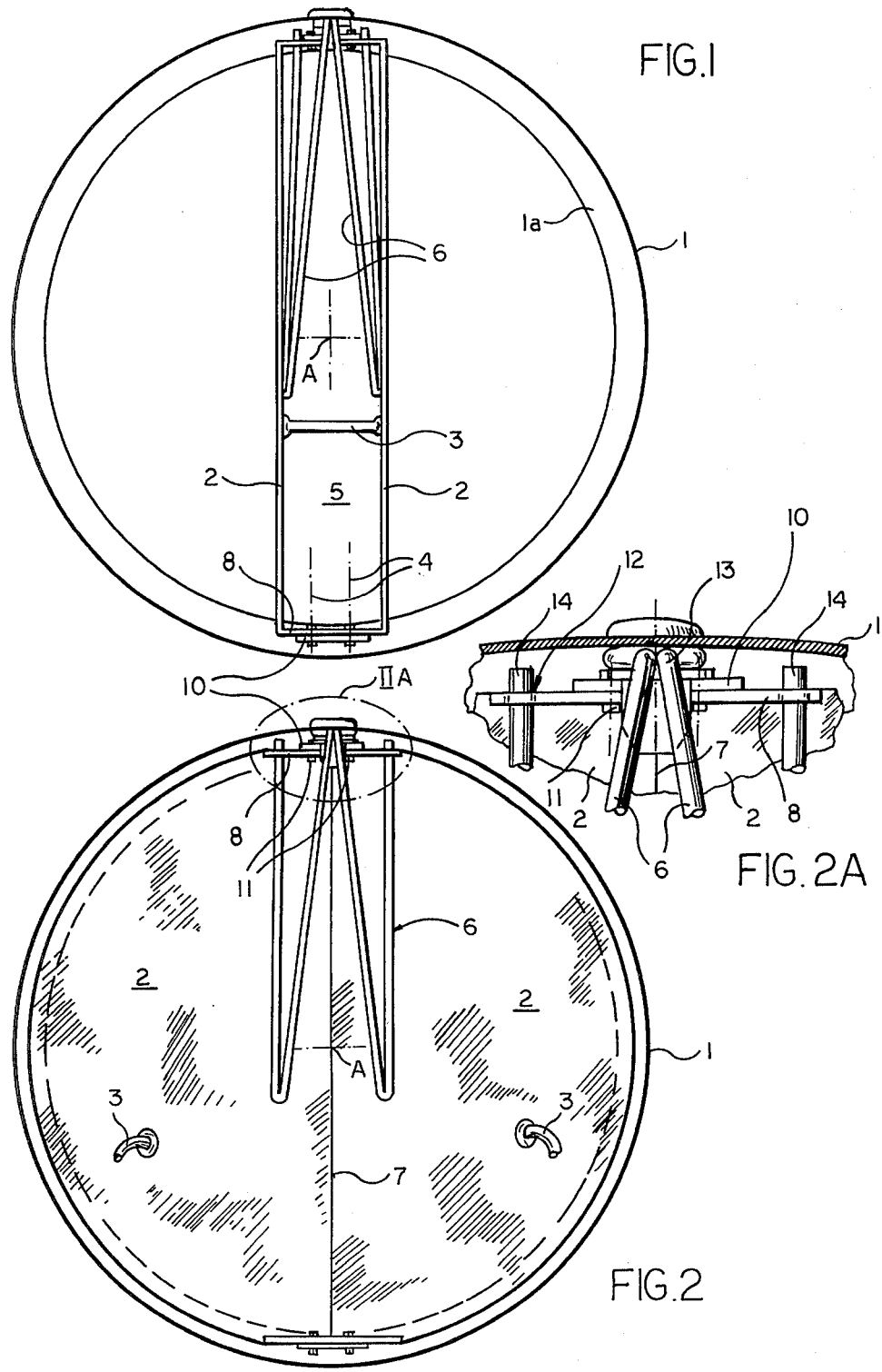
FIG. 1 is an end view of the damper assembly according to this invention in open position.
FIG. 2 is an end view of the damper assembly in the closed position.
FIG. 2A is a large-scale view of the detail indicated at IIA in FIG. 2.
Figure 3:
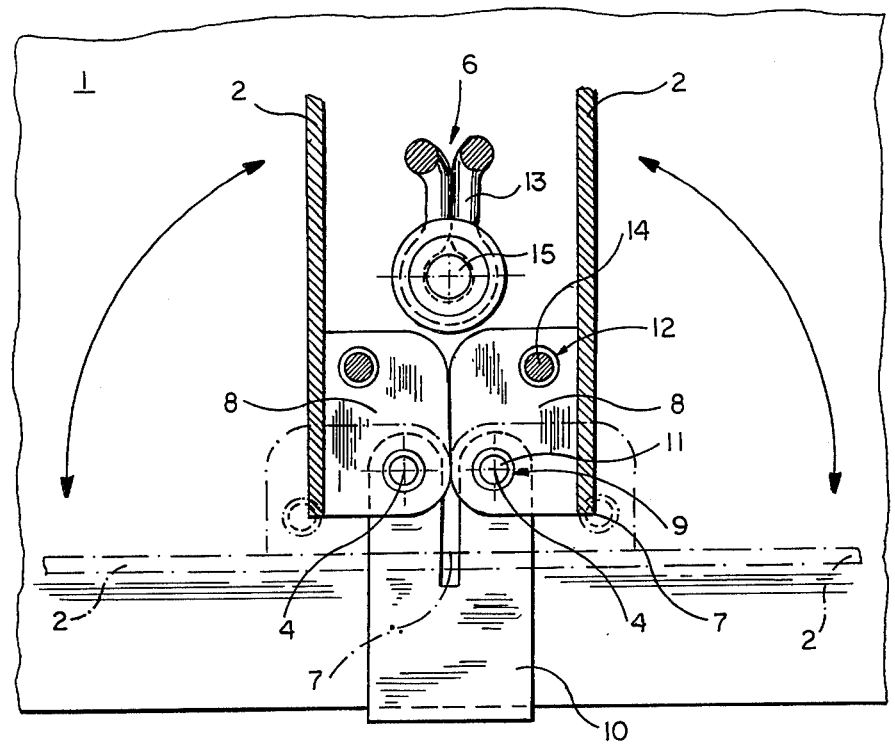
FIG. 3 is a large-scale cross-sectional detail of the assembly of this invention.

As seen in FIGS. 1–3 a fire-damper assembly has a support 1 formed as a cylindrical sheet metal ring centered on an axis A and having an inwardly directed lip 1a lying in a plane perpendicular to the axis A. The diameter of the circular inner edge of this lip is the nominal size of the assembly, which typically is slightly larger in overall cross section than the duct it is mounted in.

Two semicircular flaps 2 can pivot about respective parallel axes 4 lying in a plane perpendicular to the axis A and equispaced to diametrally opposite sides of this axis A. They have edge pivot tabs 8 formed with holes 9 through which extend pivot pins 11 engaged in a support pivot tab 10 soldered or riveted in the support ring 1. The axes 4 are offset from the planes of the respective flaps 2 and these flaps 2 are identical and move between the open position shown in FIG. 1 extending parallel to each other and to the axis A, and the coplanar closed position shown in FIG. 2 and in dot-dash lines in FIG. 3. In this closed position the straight rear edges 7 of the flaps 2 butt and these flaps 2 lie on the lip 1a, thereby effectively blocking flow through the device. In the open position the two flat flaps 2 are perfectly edge-on to axial flow, defining a flow space 5 between themselves.

A fusible alloy wire 3 that melts at about 160° F. is fixed between the two flaps 2 remote from their axes 4, bridging the flow space 5. Thus this wire is exposed equally to flow in either direction along the axis A.

A W-shaped double-hairpin spring 6 has a pair of long legs 14 seated in respective bores 12 formed in two of the tabs 8 offset radially outwardly from the axial pivot holes 9. This spring 6 has a central portion 13 secured at a rivet 15 inside the support 1. It continuously urges the two flaps 2 away from each other into the closed postiion and thereby holds the link wire 3 under tension.

Thus under normal conditions air or any other fluid can pass axially with ease through the assembly. The two flaps 2 are perfectly axially oriented to present minimum resistance to flow. In addition no matter which direction the flow is in, it will pass between the two flaps 2 and over the link wire 3. Furthermore the tabs 8 and pivot pins 11 lie wholly outside the axial flow region defined by the inner periphery of the lip 1a. Therefore they do not constitute any impediment to flow. The use of a W-shaped double-hairpin spring 6 minimizes the impediment this element offers to flow.

When, however, the wire 3 is heated to above its softening point, it ruptures. The spring 6 is then effective to pivot the two flaps 2 into the closed position, tightly blocking the duct. The hairpin-type spring 6 is oriented so that it exerts increasing angular force as the flaps move from the open to the closed position, so that the system stays closed even if considerable static pressure is applied across it.

Figure 4:
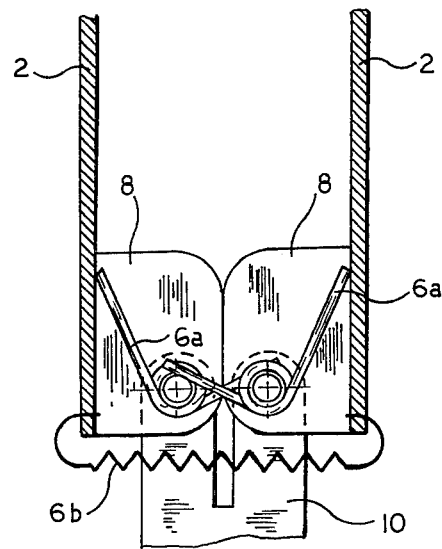
FIG. 4 is a view like FIG. 3 but showing another arrangement according to the invention.

It is also possible according to this invention to use as shown in FIG. 4 torsion springs 6a looped around the pivot pins 4 and braced between the respective flap and the other pivot pin. In addition a tension spring 6b can be braced between the flaps 2.

The system according to the instant invention therefore closes surely and rapidly, is insensitive to direction of flow, and offers a smaller impediment to flow than has hitherto been possible.

We claim:

1. A self-closing fire-damper assembly for a duct, said damper assembly comprising:

a support adapted to be secured in said duct and having a pair of support tabs defining respective parallel and spaced-apart pivot axes traversing said duct;

respective damper flaps each having a straight rear edge extending parallel to the respective axis and each being formed adjacent the respective rear edge with a pair of axially spaced upstanding pivot tabs each formed at the respective axis with a respective pivot hole and offset therefrom with a respective spring hole, respective pivot pins fixed in said support tabs and extending into said pivot holes, said flaps being pivotal on said pins about the respective axes between an open position extending generally parallel to and spaced from each other in line with said duct and flanking said pivot axes and a closed position generally coplanar transverse to said duct and with the rear edges butting, whereby said flaps define in said open position open flow spaces between and to both sides of said flaps and in said closed position said flaps substantially block flow through said duct;

biasing means including respective hairpin springs braced between said flaps and each having one leg anchored on said support and another leg engaged in the spring hole of the respective pivot tab for urging said damper flaps continuously into said closed position; and means including a fusible link connected between said flaps offset from said axes and transversely bridging one of said flow spaces for retaining said flaps in said open position unless said link is heated beyond a predetermined temperature.

2. The damper assembly defined in claim 1 wherein said flaps are substantially semicircular.

3. The damper assembly defined in claim 1 wherein said springs are formed by a single W-shaped double-hairpin spring.

* * * * *